United States Patent [19]
Bennett

[11] Patent Number: 5,715,855
[45] Date of Patent: Feb. 10, 1998

[54] TEMPERATURE-ACTIVATED VALVE

[76] Inventor: Brady J. Bennett, 4964 Empire Ave., Jacksonville, Fla. 32207

[21] Appl. No.: 806,617

[22] Filed: Feb. 21, 1997

[51] Int. Cl.$^6$ ............................ E03B 7/12; F16K 31/64
[52] U.S. Cl. ........................ 137/60; 137/61; 137/62; 137/79; 138/27; 138/32
[58] Field of Search ........................ 137/59, 60, 61, 137/62, 79, 301, 302; 237/80; 138/27, 28, 32

[56] References Cited

U.S. PATENT DOCUMENTS

| | | | |
|---|---|---|---|
| 1,878,002 | 9/1932 | Smith | 137/60 |
| 2,995,140 | 8/1961 | Managhan | 137/60 |
| 3,380,464 | 4/1968 | Arterbury | 137/60 |
| 3,456,722 | 7/1969 | Cornelius | 137/79 |
| 4,066,090 | 1/1978 | Nakajima | 137/62 |
| 4,205,698 | 6/1980 | Hucks | 137/62 |
| 4,313,452 | 2/1982 | Mellard | 137/62 |
| 4,437,481 | 3/1984 | Chamberlin | 137/60 |
| 4,484,594 | 11/1984 | Alderman | 137/62 |
| 4,699,321 | 10/1987 | Bivens et al. | 137/59 |
| 4,776,362 | 10/1988 | Domingue | 137/59 |
| 4,784,173 | 11/1988 | Carney | 137/60 |
| 4,809,727 | 3/1989 | Chamberlin | 137/62 |
| 4,815,491 | 3/1989 | Prikle | 137/62 |
| 4,967,780 | 11/1990 | Minami | 137/60 |
| 5,113,891 | 5/1992 | Carney | 137/60 |
| 5,226,448 | 7/1993 | Schiller | 137/59 |

FOREIGN PATENT DOCUMENTS

| | | | |
|---|---|---|---|
| 44-12464 | 5/1969 | Japan | 137/61 |
| 2-256726 | 10/1990 | Japan | 137/61 |

*Primary Examiner*—George L. Walton
*Attorney, Agent, or Firm*—Cesari and McKenna, LLP

[57] ABSTRACT

A temperature-actuated valve includes an elongated housing having anterior and posterior segments, the anterior segment being connected to an outdoor water supply. A valve within the anterior segment opens in response to freezing temperatures, defining a fluid path that allows water from the outdoor water supply to flow through one or more discharge ports; and which closes when the temperature rises above freezing. The valve generally includes a piston movable within the housing and having a valve head, and a valve seat formed in the anterior housing segment; seating of the valve head against the valve seat closes the discharge port(s). The device also includes means for conducting water from the anterior housing segment to the posterior housing segment, the latter comprising an expansion reservoir for freezing water. When water freezes, its expansion moves the piston so as to unseat the valve head and thereby allow water to be discharged through the discharge port(s). Thawing of the water in the expansion reservoir allows the valve head, under pressure from the outdoor water supply, to reseat.

16 Claims, 4 Drawing Sheets

TEMPERATURE-ACTIVATED VALVE

BACKGROUND OF THE INVENTION

1. Field of the Invention

The present invention relates to anti-freezing devices, and in particular to temperature-activated assemblies that prevent freezing and rupture of outdoor water-supply conduits.

2. Description of the Related Art

In regions prone to sustained periods of below-freezing temperatures, house and plumbing design generally incorporates provision for thermal protection of vulnerable pipes, such as those leading to outdoor taps or "bibbcocks." Such provision may include, for example, "no-freeze" taps with valves that seat behind thermally insulated walls, or interior cutoff valves.

In areas where severe freezing is infrequent, however, such measures may impose inconvenience or expense disproportionate to the problem. Rather than install thermal protection or risk the freezing and rupture of water pipes, residents may simply leave their outdoor valves open to a bleeding or dripping level; the temperature of household water, continuously flowing through to the outdoor valves, is usually sufficient to prevent freezing of the valve and associated plumbing. Of course, this approach requires knowledge of an impending freeze and manual operation of each valve; it is also wasteful of water in that the valves typically drip for longer than is actually necessary.

As a result, a number of automatic alternatives have been proposed. These utilize the freezing of water to actuate a valve that opens to permit sustained flow of water through the bibbcock. Unfortunately, current designs tend to be complex, difficult and expensive to manufacture, and prone to failure. For example, many designs (see, e.g., U.S. Pat. No. 4,967,780) utilize springs and/or seals that may wear out or fail suddenly and without warning; furthermore, because these devices typically do not incorporate a convenient means of testing their continued operability, the first hint of failure may be the very damage the valve was designed to prevent.

Current designs may also prove unreliable due to limited ability to discharge displaced air, or due to insufficiently complete use of the volumetric expansion of water as it freezes. Because the actual degree of expansion is relatively modest (about 11%), failure to use it fully to unseat a valve, for example, may result in tight tolerances prone to failure under operating conditions—for example, due to ice formation and retention.

DESCRIPTION OF THE INVENTION

Brief Summary of the Invention

The present invention provides a simple design for a mechanically actuated, temperature-responsive valve that efficiently utilizes the volumetric expansion of freezing water to cause water from an outdoor tap to flow through discharge ports. The invention includes means for accommodating air displaced during operation, and may also include means for allowing the device to be tested for operability.

The basic design of the invention includes an elongated housing having anterior and posterior segments, the anterior segment being connected to an outdoor water supply. A valve within the anterior segment opens in response to freezing temperatures, defining a fluid path that allows water from the outdoor water supply to flow through one or more discharge ports; and closes when the temperature rises above freezing. In particular, the valve generally includes a piston axially movable within the housing and having a valve head, and a valve seat formed in the anterior housing segment; seating of the valve head against the valve seat closes the discharge port(s). The device also includes means for conducting water from the anterior housing segment to the posterior housing segment, the latter comprising an expansion reservoir for freezing water. When water freezes, its expansion moves the piston so as to unseat the valve head. Thawing of the water in the expansion reservoir allows the valve head, under pressure from the outdoor water supply, to reseat.

In one aspect, water is conducted from the anterior housing segment to the expansion reservoir through an axial bore extending through at least a portion of the piston. The expansion reservoir is an axial segment of the housing bounded at one end by closure of the housing, and at the other end by the onset of a contact region between the piston and the interior wall of the housing. The piston necks down so as to extend axially past the contact region and into the reservoir. The axial bore through the piston opens into one or more outlet ports that are displaced a small axial distance from the piston terminus. The necked-down region of the piston defines a narrowed volume of annular cross-section within the reservoir, so that this region freezes before the remainder of the reservoir. This prevents freezing water in the remainder of the reservoir from being forced back through the axial piston bore or along the sides of the piston.

In another aspect, the anterior housing segment contains an air-displacement chamber that admits air displaced from the reservoir by incoming water. The air chamber may be defined, for example, by recession of the interior housing wall.

To permit the device to be checked for operability, the invention may also include at least one selectively openable air-bleed conduit in fluid communication with the air chamber, each air-bleed conduit defining a fluid path to the exterior of the housing. To facilitate selective opening and closing of the air-bleed conduit(s), the device may include a diverter rotatable around the housing exterior, the diverter comprising one or more apertures that may be selectively aligned with the air-bleed conduit(s) by rotation of the diverter so as to complete the fluid path of each conduit to the exterior of the housing. If the device is operating properly, under non-freezing conditions water will stream through the apertures, indicating that water is reaching the reservoir and that the piston is free to move within the housing.

BRIEF DESCRIPTION OF THE DRAWINGS

The foregoing discussion will be understood more readily from the following detailed description of the invention, when taken in conjunction with the accompanying drawings, in which.

The drawings and components shown therein are not necessarily to scale.

DETAILED DESCRIPTION OF THE PREFERRED EMBODIMENTS

Figure 1:
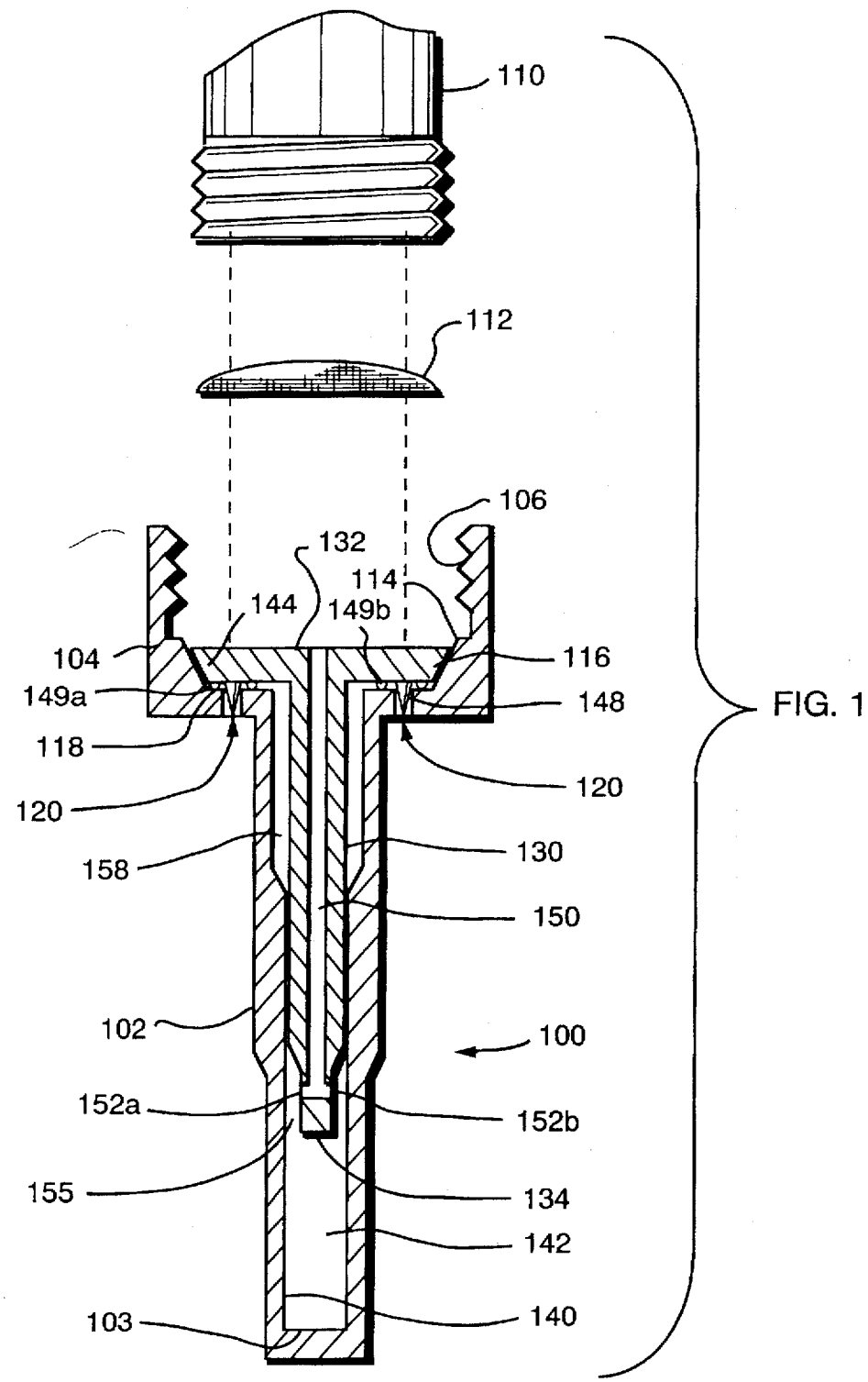
FIG. 1 is a sectional elevation of a first embodiment of the present invention, illustrating connection to a water-supply conduit.

As shown in FIG. 1, a first embodiment of the present invention comprises a generally tubular housing 100 having a lower cylindrical segment 102 that terminates at one end in a floor 103 and flares out at its other end into a wider upper segment 104. Preferably, housing 100 is fabricated from a thermally conductive material, e.g., a metal such as brass. Upper segment 104 is provided with a series of threads for engaging a bibbcock or other coupling to an outdoor water conduit 110 and, preferably, a filter screen (or other washer which may, if desired, be spring-loaded to aid in valve compression) 112. The threads 106 terminate in a shoulder 114, against which the conduit and screen 112 rest. The shoulder defines a valve seat having a wall 116 and a table or base 118, the latter including a series of water exhaust ports 120 therethrough. Base 118 may include eight such exhaust ports circumferentially arranged at 45° intervals.

A piston valve 130 having a valve head 132 and an elongated body or extension that necks down to a terminus 134 is slidably received within the housing 100. A portion of piston 130 contacts the interior wall 140 of lower cylindrical segment 102. Below this contact region (the extent of which varies with axial movement of piston 130) is a reservoir 142 within which water collects and, when it freezes, expands. Reservoir 142 is defined by the onset of the contact region between piston 130 and interior wall 140, and the floor 103 of housing 100. Preferably, piston 130 is also fabricated from a durable and resilient material such as stainless steel, brass or other metal, or a heavy-gauge polymer such as nylon or teflon.

Wall 116 is taller than valve head 132, so that even with conduit 110 and washer 112 received within upper housing segment 104, piston 130 is free to reciprocate a short distance. The outer wall 144 of valve head 132 and wall 116 of the valve seat are both beveled, but the bevel of wall 116 is longer than that of wall 144; as a result, reciprocation of piston 132 opens or closes a fluid path between conduit 110 and the water exhaust ports 120. Valve head 132 may contain a series of spikes or projections 148 that nest within exhaust ports 120 when the valve head is seated against base 118. Preferably, projections 148 are wedge-shaped in profile (e.g., conical), and may, when seated, project beyond the exterior openings of ports 120. Valve head 132 may seat directly against wall 116 or base 118, but preferably the underside of valve head 132 is provided with a pair of soft rings or washers 149a, 149b that seat on base 118, one between piston 130 and ports 120 (thereby sealing ports 120 from the interior of the housing 100) and the other between ports 120 and wall 144 (thereby sealing ports 120 from water conduit 110). Alternatively, the washers 149a, 149b may be mounted on base 118 to seat against the underside of valve head 132.

An axial bore 150 through the center of piston 130 defines a fluid communication path between conduit 110 and reservoir 142. Preferably, bore 150 does not extend to terminus 134; instead, bore 150 ends in a T-shaped configuration opening into two (or more) radial ports 152a, 152b. The region 155 of reservoir 142 that surrounds radial ports 152a, 152b is a narrow annular volume due to the constriction of piston 130 and the extension of terminus 134 below the radial ports.

The inner diameter of lower segment 102 preferably widens above the contact region between piston 130 and interior wall 140, defining an air chamber 158. With valve head 132 unseated (i.e., raised above base 118), this chamber is in fluid communication with exhaust ports 120. Preferably, the contact between piston 130 and interior wall 140 is imperfect, i.e., does not form a complete seal. Ideally, the contact is tight enough to provide for smooth movement and minimal flow of water, but just loose enough to allow the free movement of air. The wall thickness of segment 102 may narrow below the contact region between piston 130 and interior wall 140 in order to enhance thermal transfer between reservoir 142 and the outside.

In operation, water is allowed to flow through conduit 110 and into housing 100. The flow of water forces valve head 132 against base 118, sealing exhaust ports 120 closed. However, water also flows into reservoir 142 through bore 150, ejecting through radial ports 152a, 152b into the narrowed reservoir region 155. Air initially in reservoir 142 is forced past the contact region between piston 130 and interior wall 140, and into air chamber 158. (Some water may also accumulate in chamber 158, but this is not deleterious to the operation of the invention.)

When water turns to ice, its volume expands by approximately 11%. Thus, as water in reservoir 142 freezes, its expanding volume lifts piston 130, unseating valve head 132 and opening a fluid path between conduit 110 and exhaust ports 120, through which water is continuously discharged to the outside. The flow of water, originating from a relatively warm (e.g., household) source, prevents freezing along the fluid path. As the temperature rises, ice in reservoir 142 thaws; this is again aided by the flow of relatively warm water, which is free to travel along the exterior of housing 100 over reservoir 142. As the ice in reservoir 142 thaws, the flow of water from conduit 110 once again forces valve head 132 to seat. Projections 148 force any residual ice from exhaust ports 120 and prevent its significant re-accumulation, so that, when the valve is once again actuated, an unimpeded fluid path will exist between conduit 110 and the outside.

Because the region 155 of reservoir 142 contains a smaller (annular) volume of water but the same exposed surface area as the (bulk) remainder of reservoir 142, this region will freeze first. This accomplishes a number of objectives. First, accumulation of ice in region 155 closes off radial ports 152a, 152b, preventing ice formation in the bulk remainder of reservoir 142 from forcing as-yet-unfrozen water back through conduit 150. In other words, the freezing water acts as a check valve; without this feature, the volumetric expansion within reservoir 142 might be lost to backflow instead of providing the force necessary to unseat valve head 132. Indeed, because the volumetric expansion of freezing water is relatively modest, it is important to be able to utilize virtually the entire expansion against valve head 132; if the valve head is lifted only slightly, for example, this may not be sufficient to permit an adequate flow of water to prevent freezing.

Freezing of water within region 155 also acts as a seal against seepage of water along the contact region between piston 130 and interior wall 140. As noted earlier, this contact preferably does not itself form a complete seal in order to permit the flow of air into chamber 158. By creating a seal, the freezing water in region 155 blocks another possible escape path for water from reservoir 142.

It should be noted that air chamber 158 is not critical to functioning of the invention. If the reservoir is filled with water prior to use, air will be displaced through ports 120 when the piston is loaded. Obviously, air chamber 158 is desirable in obviating the need for this type of operation.

Figure 2:
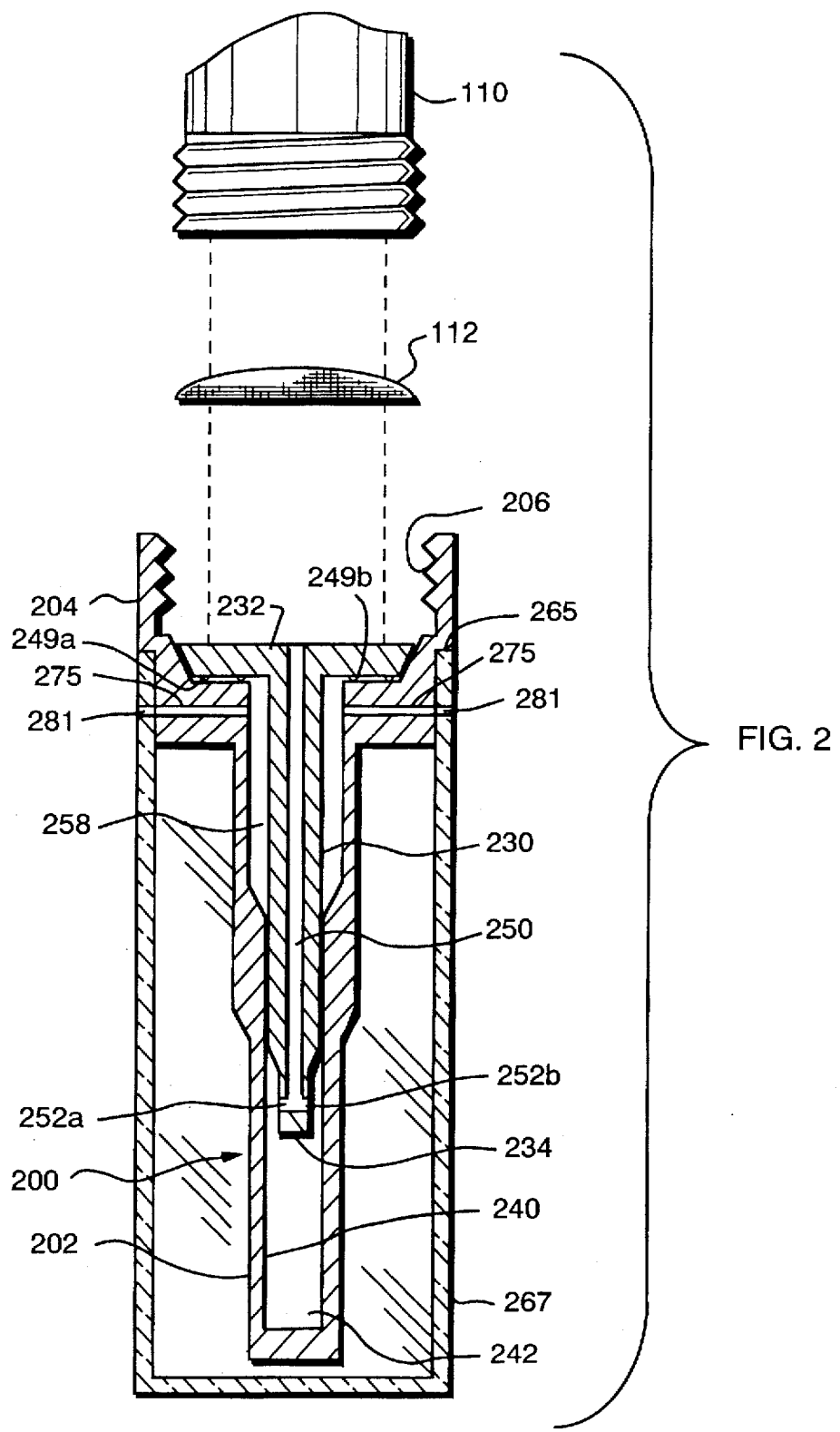
FIG. 2 is a sectional elevation of a second embodiment of the invention including air-bleed conduits and a diverter, the figure once again illustrating connection to a water-supply conduit.
Figure 3:
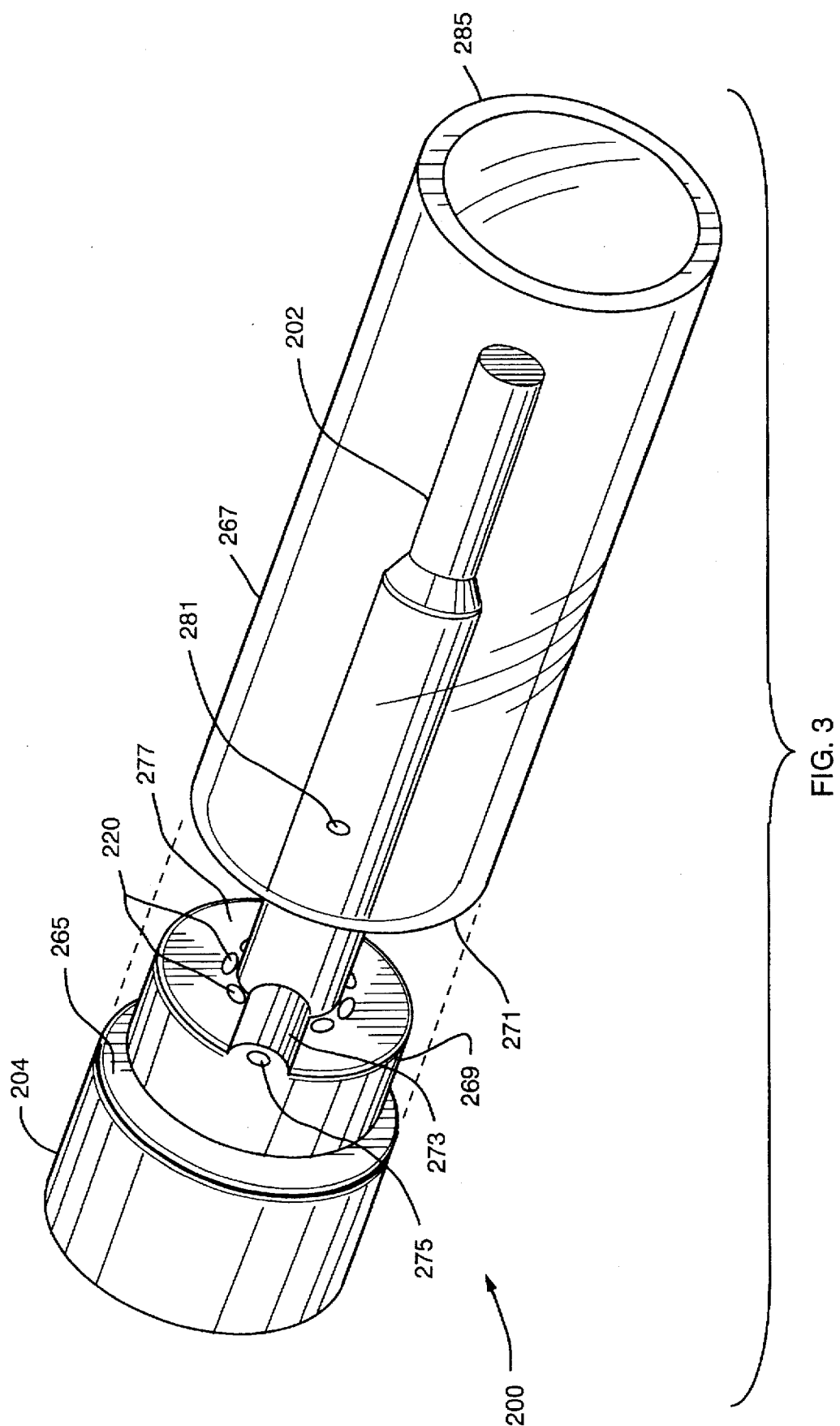
FIG. 3 is a partially exploded isometric drawing of the embodiment illustrated in FIG. 2.
Figure 4:
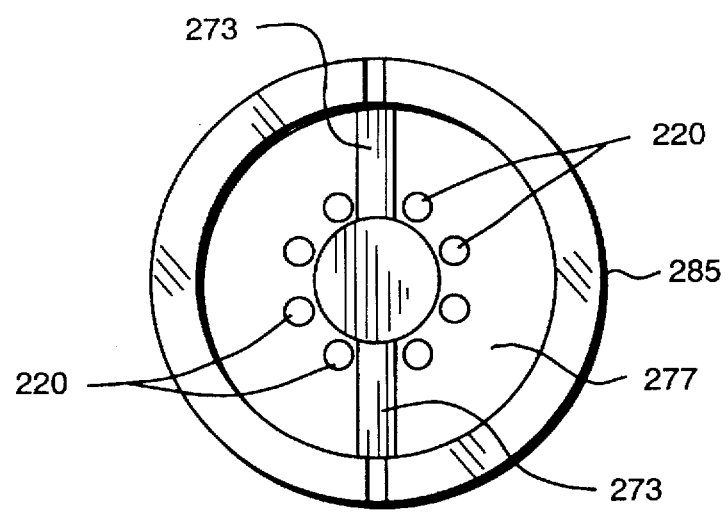
FIG. 4 is an end view of the embodiment illustrated in FIG. 2.

Refer now to FIGS. 2-4, which illustrate the second embodiment of the invention; reference numerals differing in their first digits from those of FIG. 1 denote corresponding components. This embodiment provides means for bleeding air from chamber 158, and for testing the integrity of the fluid path when the valve is closed. As shown in FIGS. 2 and 3, the upper cylindrical segment of the housing 200 narrows to form a shoulder 265. A diverter tube 267, open at both ends, receives and is rotatable about the radially narrowed portion 269 of upper segment 204 (below shoulder 265); a first end 271 of diverter 267 butts against shoulder 265. Diverter 267, which preferably has an outside diameter coextensive with that of the wider portion of upper segment 204 (above shoulder 265) to form a structure of uniform diameter, is free to rotate against shoulder 265. Diverter 267 may be held in place either by friction against the face of narrowed portion 269 or by other conventional means (e.g., a downward taper, or a flange received within a groove).

A plurality of radially directed ribs 273 each defining a channel 275 (see FIGS. 3 and 4) extend past the lower face 277 of upper segment 204. As in the previous embodiment, a plurality of water exhaust ports are provided as apertures through lower face 277. As shown in FIG. 2, channels 275 extend fully through ribs 273 to define a fluid path to air chamber 258. Diverter 267 contains a series of apertures 281 located such that appropriate rotation of diverter 267 brings apertures 281 into alignment with channels 275; otherwise, the inner wall of diverter 276 blocks (and substantially fluidly seals) channels 275.

The operation of this embodiment is similar to that of the first embodiment. However, the channels 275—selectably vented to the outside by rotation of diverter 267—provide a means for periodically testing the integrity of the fluid path in non-freezing conditions. Ordinarily, because of the imperfect seal between between piston 230 and interior wall 240, water filling reservoir 242 via aperture 250 is free to migrate into air chamber 258; the buildup of water is limited, however, by the presence of displaced air. With air chamber 258 vented to the outside by alignment of channels 275 and apertures 281, water flows freely into chamber 258, eventually streaming through apertures 281 when chamber 258 and channels 275 are filled. By observing the stream of water, the user is assured that water is reaching reservoir 242 and that piston 230 is free to move within housing 200. The user then rotates diverter 267 to close off channels 275. Diverter 267 is preferably fabricated from, for example, rubber, and has an open lower end 285 to permit water from discharge ports 220 to drain.

Diverter 267 also functions to keep water exiting ports 220 at high flow rates in proximity to the exterior of housing 200; as noted earlier, this accelerates thawing of ice in reservoir 242. On the other hand, at very low flow rates—that is, when water is just beginning to freeze in reservoir 242—it may instead be desirable to prevent water from flowing over the exterior of housing 200 in order to encourage complete extension of piston 230. This may be facilitated by conically shaped projections (see reference numeral 148 in FIG. 1) that protrude fully through ports 220 and beyond face 277, which act to channel small water flows away from housing 200.

It will therefore be seen that I have developed a reliable and easily manufactured system for preventing damage to outdoor water conduits due to freezing. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A temperature-activated valve comprising:
   a. an elongated housing having anterior and posterior segments;
   b. means for facilitating connection of the anterior housing segment to a water supply;
   c. means defining a valve within the anterior housing segment, the valve comprising:
      i. a valve head having a unitary extension therefrom, the extension being movable within the housing and having a terminus;
      ii. a valve seat formed in the anterior housing segment, the valve seat comprising means for discharging water and means for receiving the valve head so as to close the discharging means;
   d. means for conducting water from the anterior housing segment to the posterior housing segment, the posterior housing segment comprising an expansion reservoir, expansion of freezing water within the reservoir moving the extension so as to unseat the valve head and thereby allow water to be discharged through the discharging means;

wherein
   e. the means for conducting water comprises an axial bore through at least a portion of the extension and at least one outlet port therefrom, the extension and housing being configured such that freezing water closes the at least one outlet port so as to prevent water in the expansion reservoir from flowing into the axial bore.

2. A temperature-activated valve comprising:
   a. an elongated housing having anterior and posterior segments and an interior wall;
   b. means for facilitating connection of the anterior housing segment to a water supply;
   c. means defining a valve within the anterior housing segment, the valve comprising:
      i. a valve head having a unitary extension therefrom and movable within the housing;
      ii. a valve seat formed in the anterior housing segment, the valve seat comprising means for discharging water and means for receiving the valve head so as to close the water-discharging means;
   d. means for conducting water from the anterior housing segment to the posterior housing segment through the extension, the posterior housing segment comprising a water-expansion reservoir, expansion of water within the reservoir moving the extension so as to unseat the valve head and thereby allow water to be discharged through the water-discharging means; and
   e. an air chamber in the anterior housing segment surrounding the extension and spaced apart from the expansion chamber, the extension being imperfectly sealed against the interior housing wall to permit air to be displaced into the air chamber as the reservoir fills with water irregardless of whether the water freezes.

3. The valve of claim 1 wherein the water-discharging means comprises at least one discharge port, the valve head comprising, for each said at least one discharge port, an extension projecting into the port when the valve head is seated for ejecting ice from the discharge port.

4. The valve of claim 3 wherein the extensions are wedge-shaped in profile.

5. The valve of claim 1 wherein the housing comprises an interior wall, the valve further comprising an air chamber in the anterior housing segment, the extension being imperfectly sealed against the interior housing wall to permit air to be displaced into the air chamber as the reservoir fills with water.

6. The valve of claim 5 wherein the air chamber is defined by recession of the interior wall.

7. The valve of claim 6 wherein the housing has an exterior and further comprising at least one selectably openable air-bleed conduit in fluid communication with the air chamber and the water-discharging means, the air-bleed conduit defining a fluid path to the exterior of the housing.

8. The valve of claim 7 further comprising a rotatable diverter surrounding at least a portion of the housing exterior, the diverter comprising, for each said at least one air-bleed conduit, an aperture therethrough, rotation of the diverter selectably placing the aperture in opposition to the air-bleed conduit to complete the fluid path of the conduit to the exterior of the housing.

9. The valve of claim 1 wherein the extension comprises a terminus, the extension necking down to the terminus to define a narrowed extension segment within the expansion reservoir, the outlet port being displaced axially from the terminus but within the narrowed extension segment.

10. The valve of claim 2 wherein the water-discharging means comprises at least one discharge port, the valve head comprising, for each said at least one discharge port, an extension projecting into the port when the valve head is seated for ejecting ice from the discharge port.

11. The valve of claim 10 wherein the extensions are wedge-shaped in profile.

12. The valve of claim 2 wherein the air chamber is defined by recession of the interior wall.

13. The valve of claim 2 wherein the housing has an exterior and further comprising at least one selectably openable air-bleed conduit in fluid communication with the air chamber and the water-discharging means, the air-bleed conduit defining a fluid path to the exterior of the housing.

14. The valve of claim 13 further comprising a rotatable diverter surrounding at least a portion of the housing exterior, the diverter comprising, for each said at least one air-bleed conduit, an aperture therethrough, rotation of the diverter selectably placing the aperture in opposition to the air-bleed conduit to complete the fluid path of the conduit to the exterior housing.

15. The valve of claim 2 wherein the extension comprises a terminus, the extension necking down to the terminus to define a narrowed extension segment within the expansion reservoir, the outlet port being displaced axially from the terminus but within the narrowed extension segment.

16. The valve of claim 2 the means for conducting water comprises an axial bore through at least a portion of the extension and at least one outlet port therefrom, the extension and housing being configured such that freezing water closes the at least one outlet port so as to prevent water in the expansion reservoir from flowing into the axial bore.

* * * * *